(12) United States Patent
Makabe

(10) Patent No.: US 8,994,961 B2
(45) Date of Patent: Mar. 31, 2015

(54) REDUCING WHITE SPACE IN A MEDIUM FOR PRINTING

(75) Inventor: Tomokazu Makabe, Ueda (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/454,274

(22) Filed: Apr. 24, 2012

(65) Prior Publication Data

US 2012/0274961 A1 Nov. 1, 2012

(30) Foreign Application Priority Data

Apr. 28, 2011 (JP) ................................. 2011-101688

(51) Int. Cl.
*G06K 15/02* (2006.01)
*G06F 3/12* (2006.01)

(52) U.S. Cl.
CPC ........ *G06K 15/1822* (2013.01); *G06K 15/1825* (2013.01)
USPC ............ 358/1.1; 358/1.11; 358/1.18; 358/1.2

(58) Field of Classification Search
CPC .............................. G06F 3/1208; G06F 17/211
USPC ............ 358/1.1, 1.18, 1.2, 304; 715/245, 255
See application file for complete search history.

(56) References Cited

U.S. PATENT DOCUMENTS

2009/0316162 A1* 12/2009 Watanabe et al. .............. 358/1.2
2011/0109926 A1* 5/2011 Asaga ............................ 358/1.9

FOREIGN PATENT DOCUMENTS

| JP | 07-148988 | * | 6/1995 |
|---|---|---|---|
| JP | 2004-058323 | A | 2/2004 |
| JP | 2004-104647 | A | 4/2004 |
| JP | 2005-059502 | A | 3/2005 |
| JP | 2005-301345 | A | 10/2005 |
| JP | 2005-301507 | A | 10/2005 |
| JP | 2009-154298 | A | 7/2009 |

OTHER PUBLICATIONS

English language machine translation of JP 2009-154298 to Kitamura.*

* cited by examiner

*Primary Examiner* — Eric A Rust
(74) *Attorney, Agent, or Firm* — Kilpatrick Townsend & Stockton LLP

(57) ABSTRACT

Wasteful consumption of recording media is minimized without making any changes to the control device. When a string is recorded based on a string recording command and the string is a repetitive string made by repeating characters related to font data having white space on either or both the end in the direction corresponding to the conveyance direction and the end in the direction corresponding to the opposite direction, the recording control unit of the printer converts the repetitive string to a repetitive pattern formed by compressing the part of each character in the repetitive string that contains white space, and records.

11 Claims, 15 Drawing Sheets

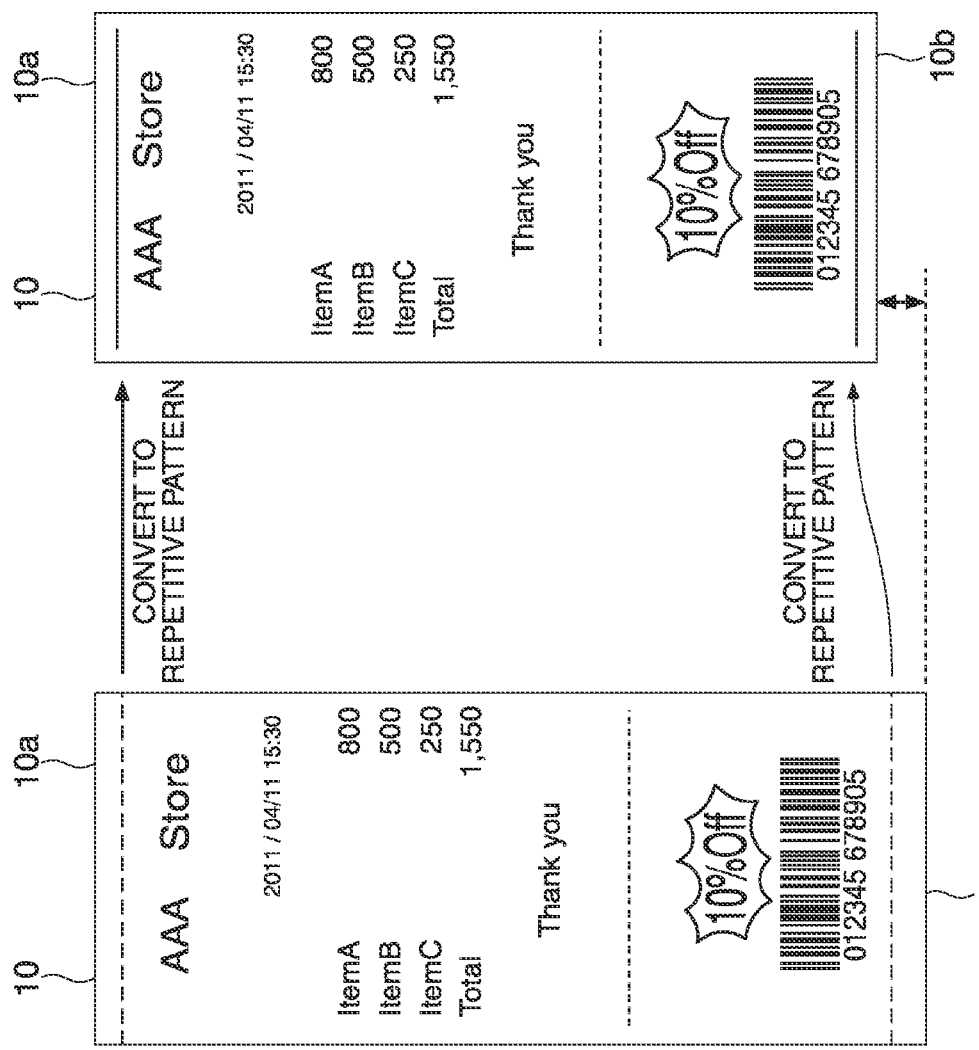

REDUCING WHITE SPACE IN A MEDIUM FOR PRINTING

This application claims priority to Japanese Patent Application No. 2011-101688, filed Apr. 28, 2011, the entirety of which is incorporated by reference herein.

BACKGROUND

1. Technical Field

The present invention relates to a recording device capable of connecting to a control device, a recording device control method, and a storage medium storing a program.

2. Related Art

Recording devices (printers) that are connectable to a control device (host computer) and record on a recording medium by means of a recording head (printhead) are known from the literature. See, for example, Japanese Unexamined Patent Appl. Pub. JP-A-2005-59502.

A common user need for recording devices that record on a recording medium such as the recording device described above is to minimize the portion of the recording medium that is not used for recording, suppress wasteful consumption of recording medium, and thus reduce costs, but this is not easily achieved. For example, the recording device must be modified so that the recording device can be made to perform an operation that suppresses recording media consumption, and this can be a fairly difficult task.

SUMMARY

The present invention minimizes wasteful consumption of recording media without modifying the control device.

One aspect of the invention is a recording device capable of connecting to a control device, including: a recording head that records on a recording medium; a conveyance unit that conveys the recording medium in a conveyance direction; a reception unit that receives characters from the control device; a storage unit that stores font data corresponding to the characters; and a recording control unit that reads font data corresponding to the characters from the storage unit and records on the recording medium based on the characters received by the reception unit, and when font data for one or more than one character (a string) on the same line corresponding to one or more than one character received by the reception unit contains white space that is not recorded in the line direction, converts the font data on the same line to font data with less white space, and records by the recording head.

In another aspect of the invention, the font data on the same line meets at least one of a group of conditions including being specific font data, including a specific amount of white space, and having a specific number.

In another aspect of the invention, the recording control unit converts font data on the same line to font data with a small font size in the conveyance direction, or to image data with a small size in the conveyance direction.

When space is contained in the line direction of the font data for one or more than one character on at least one side in, for example, the direction corresponding to the conveyance direction equivalent to the top of a character, or the direction corresponding to the opposite direction equivalent to the bottom of a character, and the characters are recorded to a recording medium, the font data for the characters is first converted to font data with a small font size in the conveyance direction or is converted to image data with a small size in the conveyance direction, and the characters are then recorded by the recording head. As a result, the size in the conveyance direction of the characters recorded on the recording medium becomes smaller, and wasteful consumption of recording media can be suppressed.

More particularly, if the control device sends characters as usual to the recording device, conversion occurs automatically on the recording device side, and there is no need to change the program or otherwise modify the control device.

In addition, deleting white space is particularly effective when the font data can be identified as specific font data with large white space, or can be identified as containing a specific amount of white space, or can be identified as a specific number of the same characters in the same line.

Furthermore, when plural characters are repeated to form a line, white space in the font data that does not contribute to drawing a line can be omitted, and recording medium can be conserved.

In a recording device according to another aspect of the invention, the font data after conversion omits at least part of the white space from the font data before conversion; and the image data after conversion omits at least part of the white space from the font data before conversion.

When characters are recorded based on font data from which white space is deleted, there is no loss of data that is used for actual recording by the recording head in the font data for the characters, and a problem with the readability of the recorded content does not occur. For example, when hyphens (-) are printed repeatedly in the same line and used as a separator, recording medium waste can be suppressed while the separator is still recognizable even though white space is removed from the conveyance direction side and the opposite side.

As a result, this embodiment can suppress wasteful consumption of recording media while preventing drawing problems and an adverse effect on legibility.

In a recording device according to another aspect of the invention, the recording control unit compares the dot count (data size) in the conveyance direction of the actual data that is actually recorded by driving the recording head and the dot count in the conveyance direction of the white space contained in the font data before conversion, and applies one of the conversions when the actual data is smaller.

When the size in the conveyance direction of the white space is smaller than the size in the conveyance direction of the actual data in the font data of a particular character, the percentage of the font data occupied by white space is sufficiently large, and applying the foregoing conversion to the string formed by the characters corresponding to the font data is particularly effective in terms of suppressing recording medium waste.

As a result, this configuration can more effectively suppress recording medium waste.

For example, when the character is a hyphen (-), deleting white space is particularly effective when there is a large amount of white space above and below the actual data, that is, the hyphen, that is actually recorded.

In a recording device according to another aspect of the invention, the recording control unit applies one of the conversions when the characters received by the reception unit are to be recorded to a specific position on the recording medium.

As a result, because the conversion described above can be applied only to characters that are recorded to specific positions instead of applying conversion unconditionally, conversion can be controlled appropriately according to the conditions.

In a recording device according to another aspect of the invention, the recording device also has a cutting unit that cuts the recording medium; and the recording control unit applies one of the conversions when the characters are to be recorded in a specific area on the upstream side in the conveyance direction or the downstream side in the conveyance direction from the cut position where the cutting unit cuts the recording medium.

In a recording device that creates receipts or other forms by recording an image on roll paper as the recording medium and cutting the roll paper after recording an image, a specific text or image may be regularly recorded to the leading end and trailing end of the form. For example, a recording device that produces receipts may record an image that is common to multiple receipts, such as the store name or logo, or an advertisement, at the leading end or trailing end of each receipt.

If the amount of white space in the direction corresponding to the conveyance direction of a string or image that is regularly frequently recorded to the leading end or trailing end part of the form can be deleted, consumption of roll paper (recording medium) can be very effectively suppressed.

In addition, text that is not regularly recorded may not be intended for substitution by another character or image and may be preferably recorded as an image using the actual font data, appear less frequently than characters that are regularly recorded to each form and therefore contribute little to suppressing roll paper consumption, and should therefore not be converted.

As a result, because characters located in a specific area on the upstream side in the conveyance direction of the cut end of the recording medium, which is the area where text or an image that is expected to be regularly recorded at the leading end is recorded, or a specific area on the downstream side in the conveyance direction of the cut end of the recording medium, which is an area where text or an image that is expected to be regularly recorded at the trailing end is recorded, are converted, consumption of recording medium can be suppressed very effectively.

In addition, characters that are not located in a specific area on the downstream side in the conveyance direction from the cut end of the recording medium, and therefore have a high possibility of not being regularly recorded, are not converted to repetitive patterns, and conversion of characters that are not intended to be replaced with another image can therefore be prevented.

A recording device according to another aspect of the invention also has a cutting unit that is disposed downstream side in the conveyance direction from the recording head and cuts the recording medium; and the recording control unit applies one of the conversions when the characters are to be recorded in a specific area on the upstream side in the conveyance direction from the cut position of the recording medium.

When cutting the recording medium with this configuration, the position of text or image recorded on the recording medium must be conveyed to the cutting unit in order to cut and remove the recording medium on which text or image is recorded by the recording head due to the distance in the conveyance direction between the recording head and the cutting unit. The area that is conveyed at this time is the leading end of the next receipt or form. Recording media will not be wasted if the store name or other regular content is recorded in this area. Reducing white space when recording at this time is particularly effective.

In other words, shrinking the margin between the leading end of the produced recording medium and the leading edge of the image recorded on the recording medium also has the following effect.

Recording devices that record images to roll paper as the recording medium, cut the roll paper on which an image is recorded, and produce a ticket include devices that regularly record specific text or image to the leading end of the ticket. For example, a recording device that prints receipts may record a common image to the leading end of each receipt. An image that is recorded after conveyance for cutting and before cutting is an image that is recorded to the leading end of the receipt, and is a very likely an image that is regularly recorded to the leading end of receipts. If the amount of white space in the direction corresponding to the conveyance direction of text or an image that is regularly frequently recorded to the leading end of the form can be deleted, consumption of roll paper (recording medium) can be very effectively suppressed.

As a result, recording medium consumption can be very effectively suppressed because images that are recorded after conveyance for cutting and before cutting, that is, strings in images that are regularly recorded to the leading end of the form, are converted as described above.

In a recording device according to another aspect of the invention, the recording control unit sets the specific position on the recording medium based on a command received from a control device or input from an input unit.

This aspect of the invention enables freely setting the area of the recording medium to which the foregoing conversion is applied, for example, and improves convenience.

Another aspect of the invention is a method of controlling a recording device that is capable of connecting to a control device and has a recording head that records on a recording medium, a conveyance unit that conveys the recording medium in a conveyance direction, a reception unit that receives characters from the control device, a storage unit that stores font data corresponding to the characters, and a recording control unit that reads font data corresponding to the characters from the storage unit and records on the recording medium based on the characters received by the reception unit, the control method including steps of: receiving one or more than one character from the control device by the reception unit; and when font data for one or more than one character on the same line corresponding to one or more than one character received by the reception unit contains white space that is not recorded in the line direction, converting the font data on the same line to font data with less white space, and recording by the recording head.

Preferably, font data on the same line is converted by the recording control unit to font data with a small font size in the conveyance direction, or to image data with a small size in the conveyance direction.

With this control method, when space is contained in the line direction of the font data for one or more than one character on at least one side in, for example, the direction corresponding to the conveyance direction equivalent to the top of a character, or the direction corresponding to the opposite direction equivalent to the bottom of a character, and the characters are recorded to a recording medium, the font data for the characters is first converted to font data with a small font size in the conveyance direction or is converted to image data with a small size in the conveyance direction, and the characters are then recorded by the recording head. As a result, the size in the conveyance direction of the characters recorded on the recording medium becomes smaller, and wasteful consumption of recording media can be suppressed.

More particularly, if the control device sends characters as usual to the recording device, conversion occurs automatically on the recording device side, and there is no need to change the program or otherwise modify the control device.

In another aspect of the invention, the font data on the same line meets at least one of a group of conditions including being specific font data, including a specific amount of white space, and having a specific number.

In addition, deleting white space is particularly effective when the font data can be identified as specific font data with large white space, or can be identified as containing a specific amount of white space, or can be identified as a specific number of the same characters in the same line.

Furthermore, when plural characters are repeated to form a line, white space in the font data that does not contribute to drawing a line can be omitted, and recording medium can be conserved.

Effect of the Invention

The present invention enables minimizing wasteful consumption of recording media without modifying the control device.

BRIEF DESCRIPTION OF THE DRAWINGS

FIG. 5A, FIG. 5B1, and FIG. 5B2 describe a repetitive string and a repetitive pattern.

FIG. 6A and FIG. 6B describe the difference between receipts 10 printed before and after the invention was applied.

DESCRIPTION OF EMBODIMENTS

Preferred embodiments of the present invention are described below with reference to the accompanying figures.

Embodiment 1

Figure 1:
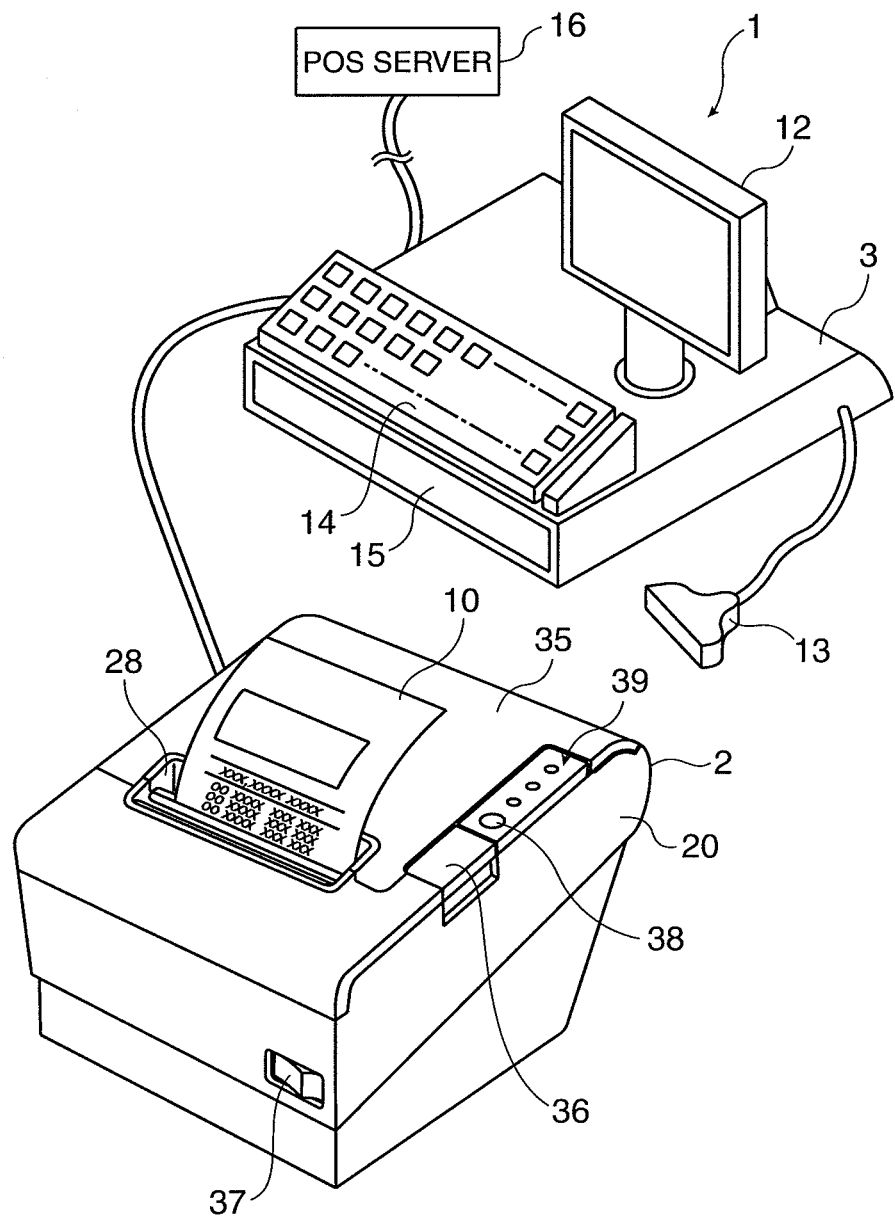
FIG. 1 shows the configuration of a POS terminal according to a first embodiment of the invention.

FIG. 1 shows the basic configuration of a POS terminal 1 according to a preferred embodiment of the invention.

Figure 2:
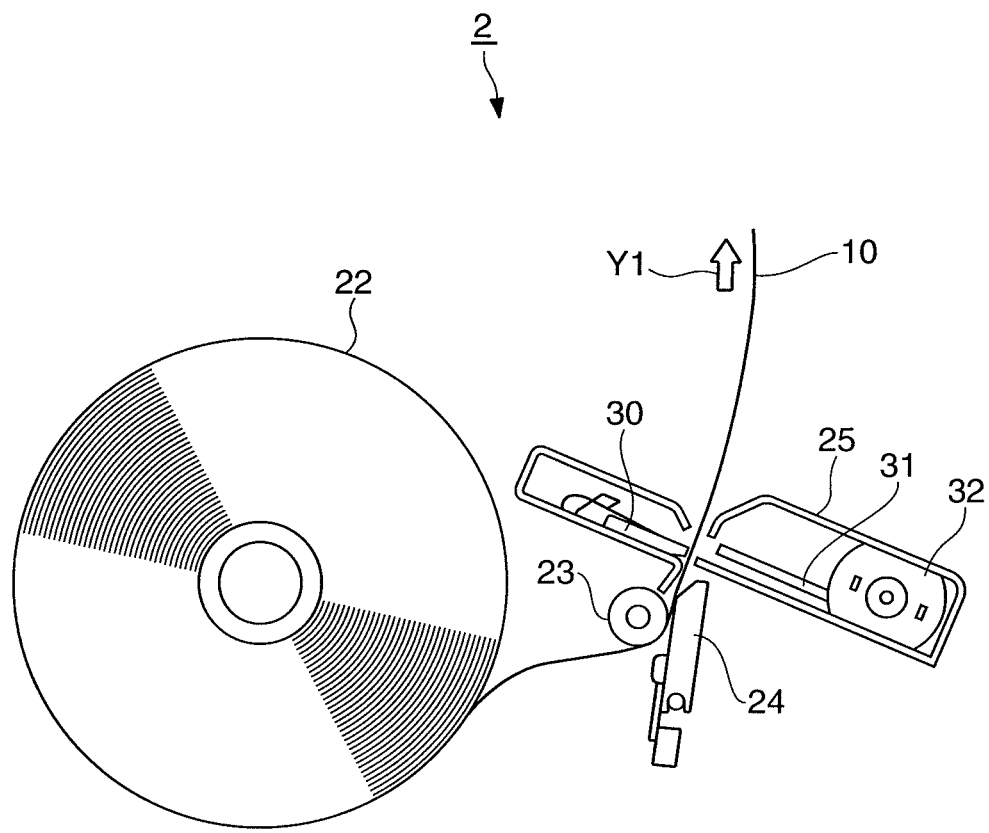
FIG. 2 shows part of the internal configuration of the printer.

FIG. 2 shows the internal configuration of a printer 2 (recording device) disposed to the POS terminal 1.

The POS terminal 1 shown in FIG. 1 is a terminal used in a point-of-sale (POS) system deployed in a retail store such as a supermarket or convenience store, for example, and includes a host computer 3 (control device) that processes sales transactions and payment processes, and a printer 2 that is connected to this host computer 3 and produces receipts 10 as controlled by the host computer 3.

The host computer 3 includes a display 12 that displays the content of the sale transaction process and payment process, a barcode scanner 13 that reads barcodes affixed to the products in the sale transaction process, a keyboard 14 with keys including an ENTER key, and a cash drawer 15 that stores cash used for payment processing. A POS server 16 that collects information entered in the sales transaction process is also connected to the host computer 3.

To issue a receipt 10, the host computer 3 accesses the POS server 16 to get the information needed to produce a receipt 10 based on input values from the barcode scanner 13 and input values from the keyboard 14, and generates and outputs to the printer 2 a control command that causes the printer 2 to perform the operation for issuing a receipt 10. The printer 2 then operates different parts thereof based on the control command input from the host computer 3 to produce a receipt 10.

As shown in FIG. 1 and FIG. 2, the printer 2 used as a recording device stores thermal roll paper 22 as the recording medium inside the printer case 20, and has a roller platen 23 (conveyance unit) that conveys the thermal roll paper 22, a recording head 24 disposed opposite the platen 23, and a cutter unit 25 (cutting unit) that cuts the thermal roll paper 22.

The printer 2 is a thermal line printer that records images by applying heat to the recording surface of the thermal roll paper 22 by driving the recording head 24, which has heat elements disposed in a line, to form dots on the recording surface of the thermal roll paper 22 while driving a paper feed motor 26 (FIG. 3) to rotate the platen 23 and convey the thermal roll paper 22 in the conveyance direction Y1. A control unit 50 described below, the paper feed motor 26, and platen 23 work together and function as a conveyance unit.

The thermal roll paper 22 on which an image was recorded is conveyed to the outside from a paper exit 28 formed in the top of the case 20, and is cut by the cutter unit 25 disposed on the upstream side of the paper exit 28 in the conveyance direction Y1, forming a receipt 10.

As shown in FIG. 2, the cutter unit 25 of the printer 2 has a fixed knife 30 disposed on one side of the thermal roll paper 22 conveyance path, a movable knife 31 disposed on the other side of the thermal roll paper 22 conveyance path opposite the fixed knife 30, and a cutter drive motor 32 that causes the movable knife 31 to slide against the fixed knife 30. The drive force of the cutter drive motor 32 causes the movable knife 31 to move toward the fixed knife 30 through an intervening drive mechanism (not shown in the figure) and cut the thermal roll paper 22 held between the fixed knife 30 and movable knife 31.

As also shown in FIG. 1, an openable cover 35 is disposed to the case 20 of the printer 2. A lever 36 for opening the cover 35 is also disposed to the case 20, and when the cover 35 is opened, the space that holds the thermal roll paper 22 is exposed and thermal roll paper 22 can be added or replaced. Also disposed to the case 20 are a power switch 37 for turning the printer 2 on and off, a paper feed switch 38 for manually advancing the thermal roll paper 22, and an LED panel 39 that displays the printer 2 status, errors, and other information by turning on or off in a specific pattern.

Figure 3:
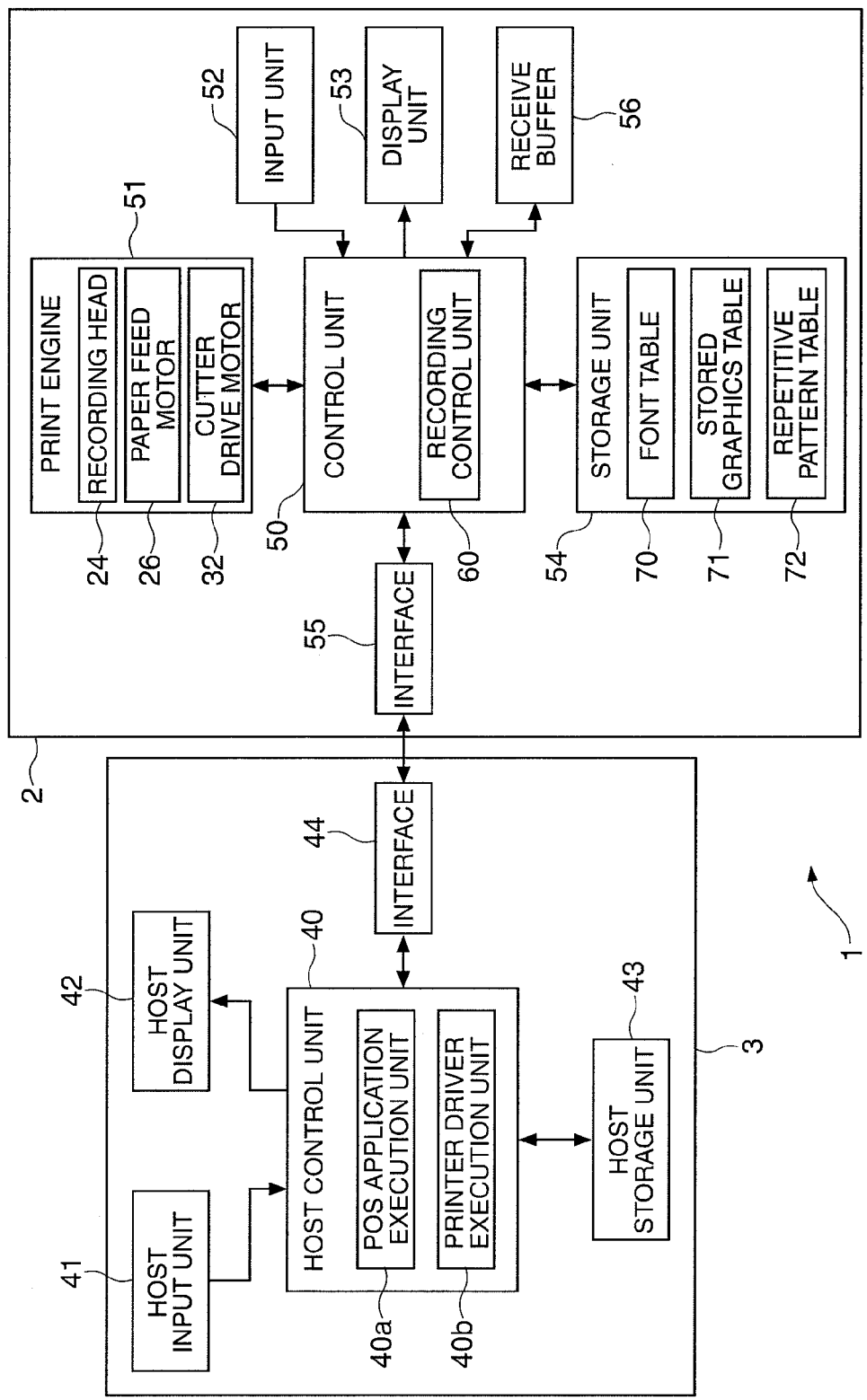
FIG. 3 is a block diagram showing the functional configuration of a POS terminal.

FIG. 3 is a block diagram showing the functional configuration of the POS terminal 1.

As shown in FIG. 3, the host computer 3 has a host control unit 40, host input unit 41, host display unit 42, host storage unit 43, and host-side interface 44.

The host control unit 40 centrally controls the host computer 3, and includes a CPU that runs programs, ROM that stores the basic control program run by the CPU, RAM used as working memory to temporarily store process data and programs run by the CPU, and other related peripheral circuits. The host control unit 40 includes a POS application execution unit 40a and printer driver execution unit 40b, which are further described below.

The host input unit 41 is connected to input devices including the foregoing keyboard 14, detects operation of the input devices, and outputs to the host control unit 40.

The host display unit 42 is connected to the display 12, and displays information including the content of the sales transaction process and payment process on the display 12 as controlled by the host control unit 40.

As described above, the host computer 3 is also connected to the barcode scanner 13, cash drawer, and other cash register peripherals. Interfaces for connecting these devices are installed to the host computer 3, and device drivers for controlling the devices are also previously installed.

The host storage unit 43 could be a hard disk drive or nonvolatile memory such as an EEPROM device, and nonvolatilely stores data rewritably.

The interface 44 communicates with the printer 2 according to a known communication protocol as controlled by the host control unit 40.

The printer 2 is a thermal line printer for printing receipts 10 as described above, and as shown in FIG. 3 has a control unit 50, print engine 51, input unit 52, display unit 53, storage unit 54, and interface 55.

The control unit 50 centrally controls other parts of the printer 2, and like the host control unit 40 described above includes a CPU, ROM, RAM, and other peripheral circuits.

The print engine 51 produces a receipt 10 by operating the recording head 24, paper feed motor 26, and cutter drive motor 32 as controlled by the recording control unit 60 of the control unit 50 to record an image on the thermal roll paper 22 and then cut the thermal roll paper 22 on which an image was recorded. Recording control unit 60 function is achieved by the cooperation of hardware and software, such as by the CPU reading and executing firmware or a program.

The input unit 52 is connected to the power switch 37 and paper feed switch 38, detects operation of these switches, and outputs to the control unit 50.

The display unit 53 outputs a drive signal to the LED panel 39 as controlled by the control unit 50, and causes the LED panel 39 to turn on/off in a specific pattern.

The storage unit 54 could be a hard disk drive or nonvolatile memory such as an EEPROM device, and nonvolatilely stores data rewritably. The data stored in the storage unit 54 is described below.

The interface 55 communicates with the host computer 3 according to a known communication protocol. The interface 55 and control unit 50 work together to function as a reception unit that receives control commands from the host computer 3.

The basic operation of the POS terminal 1 when producing one receipt 10 is described next while describing the POS application execution unit 40a and printer driver execution unit 40b.

By executing a POS application previously installed to the host computer 3, the POS application execution unit 40a acquires the information to be recorded on the receipt 10 (FIG. 4B), including information identifying the purchased products, product price information, and total purchase amount information, by accessing the POS server 16 and acquiring the necessary information for each transaction, generates print data including the image information to be recorded on the receipt 10 based on the acquired information, and outputs to the printer driver execution unit 40b.

By running the printer driver previously installed to the host computer 3, the printer driver execution unit 40b generates control commands in the command language used by the printer 2 based on the print data input from the POS application execution unit 40a, and outputs the control commands to the printer 2.

A control command is a group of commands that cause the printer 2 to perform the operations related to producing a receipt 10, and include a conveyance command HC for conveying the thermal roll paper 22 a specific paper feed distance, a cutting command SC for cutting the paper with the cutter unit 25, and the recording data 80.

The recording data 80 (FIG. 4A) is image information to be recorded to the thermal roll paper 22, and more specifically is the content of the image to be recorded (such as text strings, particular graphics, barcode data), and information for recording the information in a particular order. Specific examples of the recording data 80 are described below.

The control commands output from the host computer 3 to the printer 2 are stored sequentially in the receive buffer 56. The recording control unit 60 of the control unit 50 of the printer 2 controls the print engine 51 to perform operations related to producing a receipt 10 by sequentially reading and executing the control commands stored in the receive buffer 56. More specifically, the recording control unit 60 records a specific image on the thermal roll paper 22 and conveys the paper as needed for image recording by controlling the print engine 51 based on the recording data 80.

Specific examples of the recording data 80 and a receipt 10 on which an image is recorded based on the recording data 80 are described next.

Figures 4A, 4B:
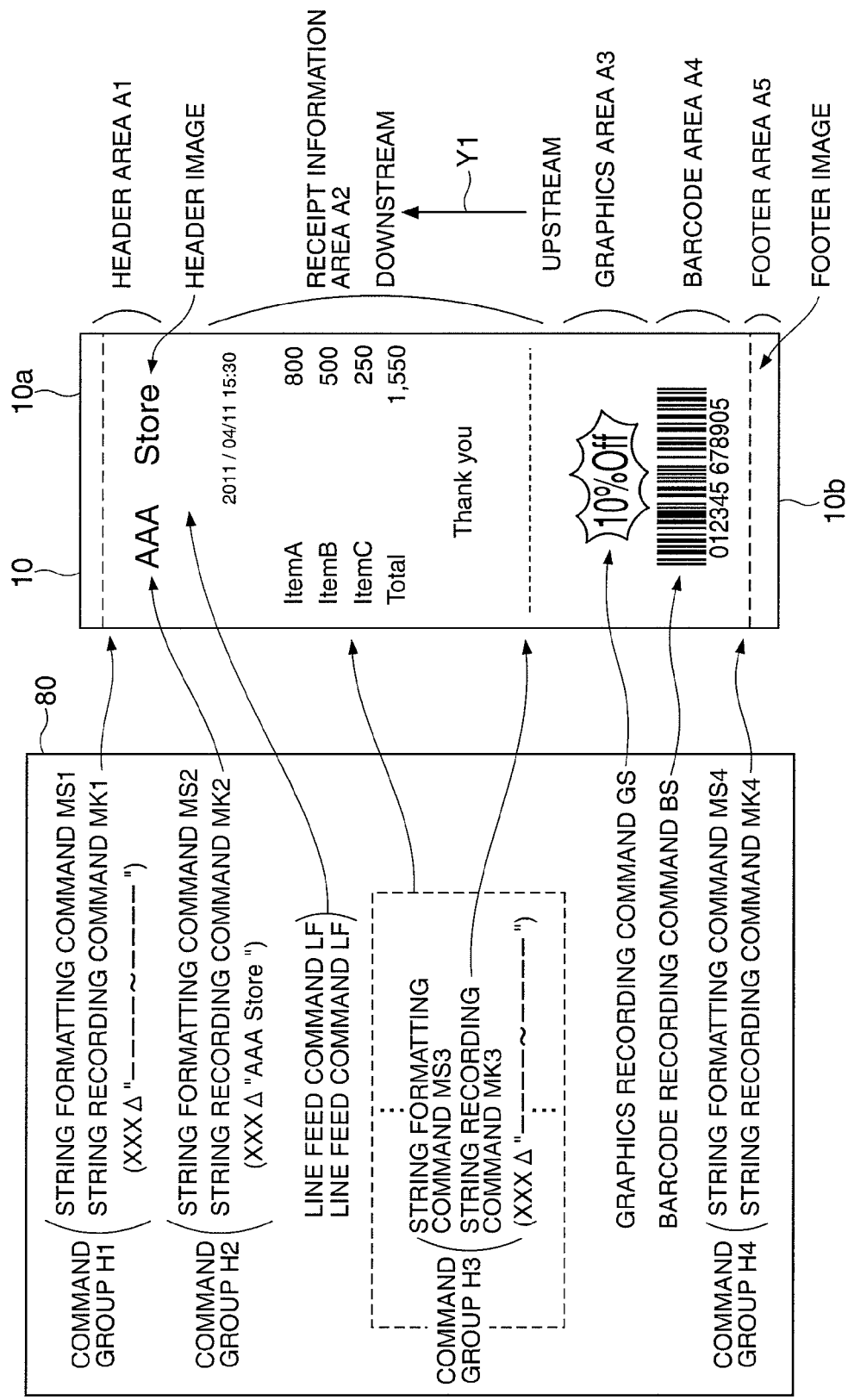
FIG. 4A and FIG. 4B show examples of recording data and a receipt.

FIG. 4A shows an example of the recording data 80 content, and FIG. 4B shows an example of a receipt 10 on which an image is recorded based on the recording data 80 shown in FIG. 4A.

The receipt 10 in FIG. 4B is a receipt 10 resulting from recording an image based on the recording data 80 shown in FIG. 4A without using this invention.

The direction toward the top of the receipt 10 in FIG. 4B corresponds to the conveyance direction Y1. Therefore, after leading end 10a is formed by cutting the thermal roll paper 22, an image is formed by sequentially forming dots from the leading end 10a of the receipt 10 toward the trailing end 10b of the receipt 10, and the thermal roll paper 22 is then cut at the trailing end 10b, producing a receipt 10.

Other than specific exceptions, the layout of the receipts 10 produced by the printer 2 in this embodiment of the invention is basically the same for every receipt 10.

More specifically, as shown in FIG. 4B, a header area A1, receipt information area A2, graphics area A3, barcode area A4, and footer area A5 are formed sequentially on each receipt 10 from the leading end 10a to the trailing end 10b, that is, in the order recorded by the recording head 24.

The header area A1 is an area where a specific body of text is printed regularly in a specific format. In the receipt shown in FIG. 4B, the string "-----" (a continuous string of "-" characters equal to the number of printable columns; the number of printable columns being the maximum number of characters that can be recorded continuously on one line) is recorded in a standard size aligned to the left side (here and below meaning the string is recorded sequentially from the left side of the width of the receipt 10), and the string "AAA ⊗ Store" (where here and below ⊗ represents a space) is recorded centered (meaning the string is recorded in the middle of the width of the receipt 10) on the next line at twice the standard character size.

Except for specific exceptions, the same text is recorded in the same format in the header area A1 of every receipt 10 produced by the printer 2. The two strings described above that are recorded in the header area A1 are referred to as the "header image" below. More specifically, the header image is the image related to the strings that are regularly recorded at the leading end of the receipt 10.

The receipt information area A2 is the area where the date and time the receipt 10 was printed, the names of purchased products, price prices, total purchase amount, and other additional information are recorded as text. This receipt information area A2 anticipates that images will be recorded in different ways, and the layout of this area can differ on each receipt 10. The string "-----" is therefore recorded in the receipt information area A2 of the sample receipt 10 shown in FIG. 4B, but this string is not recorded in a fixed format, and may not be recorded in some circumstances depending on the print data output by the POS application execution unit 40a.

The graphics area A3 is an area where a specific graphic is recorded. These graphics are further described below.

The barcode area A4 is an area where a barcode is recorded.

The footer area A5 is an area where a specific string is regularly recorded in a fixed format. The string "-----" shown in the sample in FIG. 4B is recorded left-aligned in the standard size.

Except for specific exceptions, the same text is recorded in the same format in the footer area A5 of every receipt 10 produced by the printer 2. More specifically, the string "-----" is recorded.

The string recorded in the footer area A5 is referred to as the footer image below. More specifically, the footer image is the image related to the string that is regularly recorded at the trailing end of the receipt 10.

As described above, the recording data 80 is data including the image information to be recorded on the thermal roll paper 22, and more specifically is data comprising commands for recording a specific image in a specific format on the thermal roll paper 22 arranged in the order to be recorded. The recording control unit 60 in the control unit 50 of the printer 2 sequentially reads and executes the commands in the recording data 80 to record images on the thermal roll paper 22 and convey the thermal roll paper 22 as required to record the images.

In FIG. 4A, command group H1 is the command group that records the string "-----" contained in the two lines of text in the header image of the receipt 10 in a specific format, and includes two commands, a string formatting command MS1, and a string recording command MK1.

The string formatting command MS1 is a command that specifies the styles to be applied to the string "-----", and more specifically is a command setting the character size to the standard size, and the text alignment to left aligned. Note that text styles mean applying some process related to drawing the text to be recorded, and in addition to such operations as enlarging the text or moving the position of the text, are equivalent to adding such attributes as reducing, rotating, adding emphasis, bold, or other styled characters or symbols.

The string recording command MK1 is a command telling the printer 2 to record the string "-----". In this embodiment, the string recording command basically includes a command code and a string of a combination of characters written with specific character codes (such as ASCII codes). For example, the string recording command MK1 is XXX⊗ "-----" (where XXX is a command code for recording a string, and the string in double quotes is a string containing a combination of ASCII characters).

In this embodiment one string is recorded based on one string recording command MK. A string recorded based on one string recording command MK is a string of characters recorded on the same line.

The recording control unit 60 controls the print engine 51 to record the string in the string recording command MK1 to the recording medium after applying the styles specified by the string formatting command MS1. As a result, the string "-----" will be recorded left-aligned in the standard size as shown in FIG. 4B.

More specifically, a font table 70 is stored in the storage unit 54 of the printer 2. The font table 70 is a table that stores font data sets; the font data is data expressing the characters in a format enabling recording to the thermal roll paper 22. The format of the font data in this embodiment of the invention is bitmap font data. In addition to bitmap font data, the font data could be stored as scalable font data, vector font data, or outline font data, for example.

Note that a "character" recorded to the thermal roll paper 22 in this embodiment of the invention is not limited to characters used for writing words (such as the alphabet), and conceptually includes any graphic symbol that can be recorded to the thermal roll paper 22 based on font data stored in the storage unit 54.

Characters expressed by ASCII codes correspond directly to font data stored in the font table 70, and information about this relationship is previously stored in the storage unit 54. For example, a table storing the relationship between each ASCII code and the location of the font data corresponding to each ASCII code (that address where the font data is stored in the font table 70) is previously stored in the storage unit 54.

To then record the string "-----" based on the string formatting command MS1 and string recording command MK1, the recording control unit 60 references the font table 70 and the information describing the correlation between the ASCII code and the font data, gets the font data for each character in the string, applies the styling specified by the string formatting command MS1, and based on the acquired font data writes image data (bitmap data) for the string in the print buffer (not shown in the figure). Next, the recording control unit 60 records the string "-----" by driving the recording head 24 and paper feed motor 26 based on the image data for the string written to the print buffer, and forming the dots composing an image of the string on the thermal roll paper 22.

Command group H2 following command group H1 is a group of commands for recording the string "AAA⊗ Store" in a specific format, and in this embodiment includes a string formatting command MS2 that sets the size of the string to twice the standard size and specifies center aligning the string, and a string recording command MK2 that tells the printer 2 to record the string "AAA⊗ Store".

Based on the commands contained in the command group H2, the recording control unit 60 controls the print engine 51 to record the string "AAA⊗ Store" center aligned at twice the standard size as shown in FIG. 4B.

Two line feed commands LF follow the command group H2. As a result, as shown in FIG. 4B, two lines are inserted after the string "AAA⊗ Store".

Commands related to recording the receipt information area A2 follow the two line feed commands LF.

These commands related to recording the receipt information area A2 include command group H3.

Command group H3 is a group of commands for recording the string "-----" in the receipt information area A2, and includes a string formatting command MS3 that sets the character size to the standard size and specifies left aligning the string, and a string recording command MK3 that tells the printer 2 to record the string "-----".

Note that as described above the receipt information area A2 is an area where images are recorded in various formats, and the string "-----" may not be recorded in some instances. In such cases the command group H3 is not included.

A graphics recording command GS follows command group H3.

The recording control unit 60 records an image on the thermal roll paper 22 based on this graphics recording command GS.

More specifically, a stored graphics table 71 is stored in the storage unit 54 of the printer 2. This stored graphics table 71 stores image data for plural graphics related to a unique identification code assigned to each image. The image data for these graphics is bitmap data representing a specific image (graphics image) that is not an image recorded based on font data, such as bitmap data for the image recorded in graphics area A3 of the receipt 10 in FIG. 4B (an image drawing the string "10% Off" inside a styled bubble for emphasis).

The graphics recording command GS also contains information identifying the identification code of the graphics image to be recorded, and to record the graphic based on the graphics recording command GS, the recording control unit 60 references the stored graphics table 71 to get the graphics image data identified by the identification code, writes the acquired image data to the print buffer, and controls the print engine 51 based on the buffered image data to record the image.

Note that the graphics recording command GS could be written to contain the bitmap data for the image to the recorded in the graphics area A3, and cause the printer to record the image expressed by the bitmap data. In this case the recording control unit 60 writes the bitmap data contained in the graphics recording command GS to the print buffer, and then records the image.

A barcode recording command BS follows the graphics recording command GS.

The barcode recording command BS includes a command specifying the settings for the HRI (Human Readable Interpretation) line (whether to record the HRI, where to record the HRI relative to the barcode), a command specifying the size of the recorded barcode, and a command specifying the string to be converted to a barcode ("unconverted string") and directing recording a barcode image based on the unconverted string.

To record a barcode based on the barcode recording command BS, the recording control unit 60 gets the unconverted string contained in the barcode recording command BS, converts the unconverted string to a bitmap representation of the barcode image using a specific function rendered in firmware, writes the bitmap data representing the barcode image to the print buffer to reflect the HRI settings and barcode size settings, and then controls the print engine 51 based on the buffered bitmap data to record an image of the barcode and HRI on the thermal roll paper 22.

Command group H4 follows the barcode recording command BS.

Command group H4 is a group of commands for recording the string "-----" in the footer area A5, and includes string formatting command MS4 that sets the text size to the standard size and the text alignment to left aligned, and a string recording command MK4 telling the printer 2 to record the string "-----".

The printer 2 according to this embodiment of the invention records on thermal roll paper 22 as described above, and there is a need to suppress wasteful consumption of thermal roll paper 22 as much as possible and help reduce costs.

In addition, the printer 2 can preferably be made to perform an operation that suppresses thermal roll paper 22 consumption without needing to modify the host computer 3, including modifying programs or replacing programs, or replace the host computer 3 or modify any component parts. This is because applying the invention to the POS terminal 1 is made easier by not needing to modify the host computer 3. In addition, when the POS terminal 1 is assembled by connecting a printer 2 to an existing host computer 3 previously installed in a store, the ability to simply purchase and install the printer 2 without needing to modify the host computer 3 offers advantages in terms of ease of installation and reliable connectivity for the store, and the advantage of greater added value in the printer 2 for the business that sells and provides the printer 2 (such as the printer manufacturer).

The printer 2 according to this embodiment of the invention therefore operates as described below.

When recording a string based on a string recording command MK and the string is a repetitive string of characters expressed by font data forming white space on either or both the side of the characters in the conveyance direction or the side in the reverse direction, the recording control unit 60 of the control unit 50 of the printer 2 according to this embodiment of the invention converts the repetitive string to a repetitive pattern (image data) that compresses the white space in each character of the repetitive string, and records the repetitive pattern to the thermal roll paper 22.

Figure 5A:
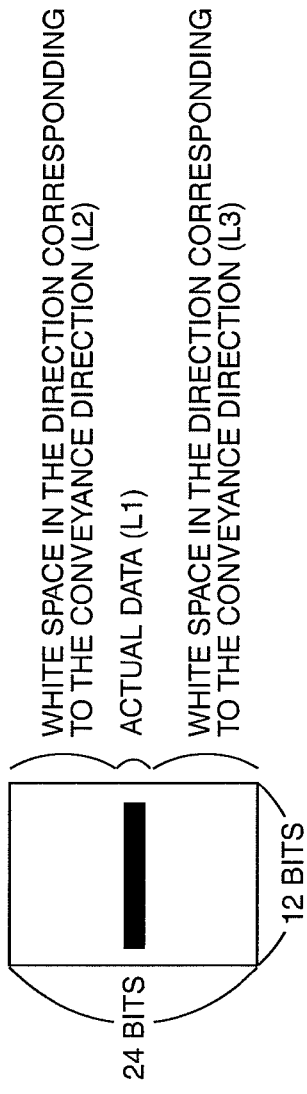
Figure 5B:
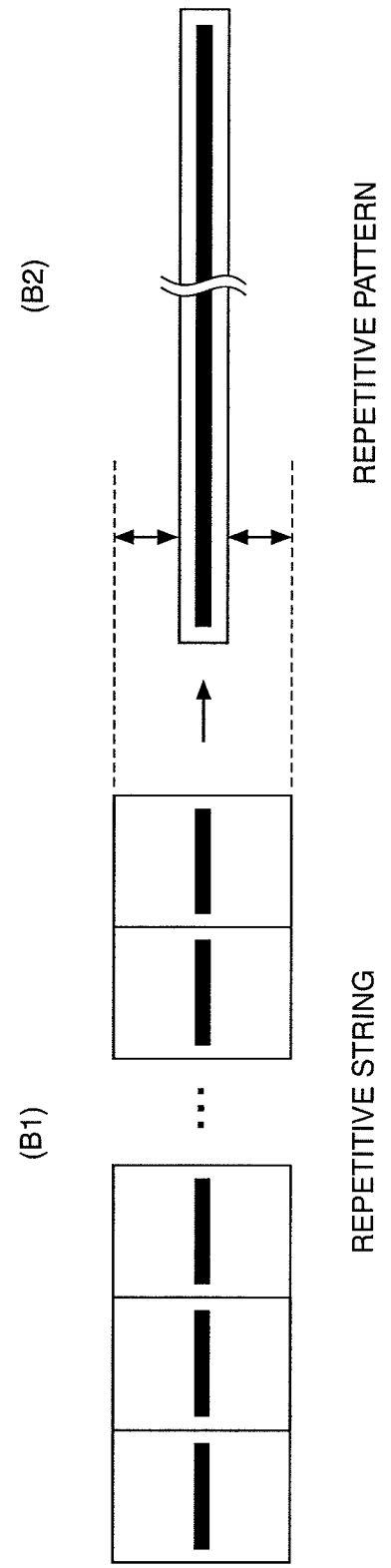

FIG. 5A, FIG. 5B1, and FIG. 5B2 describe a repetitive string and repetitive pattern, FIG. 5A showing the font data for a hyphen (-) character, FIG. 5B1 showing the font data for the string "-----", and FIG. 5B2 showing a repetitive pattern (image data) for the same string.

As shown in FIG. 5A, the font data is 24 dots high and 12 dots wide. Each pixel in the font data corresponds to a dot in the image of the character actually recorded on the thermal roll paper 22 based on the font data, and a character recorded on the thermal roll paper 22 based on the corresponding font data is formed as an image of 24×12 dots on the thermal roll paper 22 when styling to enlarge or reduce the character is not applied.

To simplify the following description, each pixel in the font data is either a black pixel or a white pixel, and characters are formed by groupings of black pixels.

As shown in FIG. 5A, the font data for a hyphen (-) character is expressed by a group of black pixels. White space consisting of only white pixels is formed at the end of the font data on the side in the direction corresponding to the conveyance direction of the black pixels forming the hyphen (-), and white space consisting of only white pixels is formed at the end of the font data on the side in the direction corresponding to the opposite direction as the conveyance direction (simply "opposite direction" below) of the black pixels forming the hyphen (-).

The "direction corresponding to the conveyance direction" as used here refers to the conveyance direction when recording characters based on the font data, and the "direction corresponding to the opposite direction" means the opposite direction when recording characters based on the font data.

The white space in the font data for the hyphen (-) character is where the recording head 24 is not driven and does not actually record. Because the white space is where black pixels are not formed and the recording head 24 is not driven and does not actually record, the printed characters are not malformed and no drawing problems result from recording the hyphen (-) character based on data from which at least part of this white space has been deleted. There is also no adverse effect on text legibility.

The portion of the font data expressing a particular character by a group of black pixels (for example, the part of the font data for the hyphen (-) character where the hyphen (-) is formed by a group of black pixels) is referred to below as the actual data. The actual data is the part of the font data that is actually recorded by driving the recording head 24.

In addition, font data in which white space consisting of only white pixels is formed on at least one end in the direction corresponding to the conveyance direction or the direction corresponding to the opposite direction is referred to below as "font data with white space."

When recording a string "-----" consisting of repeated hyphen (-) characters, which is font data with white space, the recording control unit 60 of the printer 2 according to this embodiment of the invention converts the string to a repetitive pattern formed by compressing the portion containing the white space, and records an image based on the repetitive pattern.

More specifically, to record the string "-----" shown in FIG. 5B1, the recording control unit 60 converts the string to the repetitive pattern shown in FIG. 5B2.

The repetitive pattern in FIG. 5B2 is bitmap data formed by reducing the part corresponding to the white space in each hyphen (-) character in the string "-----".

By reducing the white space, the number of dots (size) in the direction corresponding to the conveyance direction of the thermal roll paper 22 can be reduced compared with the unconverted string. In addition, because the repetitive pattern is formed by compressing white space composed of only white pixels, none of the black pixels forming the character are malformed and no drawing problems result. In addition, the repetitive pattern shown in FIG. 5B2 is bitmap data for an image of a single line extending widthwise. This is based on the string "-----" being an attempt to form a single line using font data.

As a result, by converting the string "-----" to a repetitive pattern formed by compressing the white space by line unit and recording based on this repetitive pattern, the recording control unit 60 can suppress wasteful consumption of recording medium by the amount the white space is compressed.

FIG. 6A and FIG. 6B compare the results of recording a specific string without conversion to a repetitive pattern and with conversion. FIG. 6A shows a receipt 10 printed without conversion (the same receipt 10 shown in FIG. 4B), and FIG. 6B shows the receipt 10 printed after conversion.

In the example shown in FIG. 6B, the string "-----" in header area A1 and the string "-----" in footer area A5 are converted by line unit to repetitive patterns. As a result, the length of the receipt 10 after conversion is shortened, and consumption of thermal roll paper 22 is reduced.

Note that the string "-----" in receipt information area A2 in the example shown in FIG. 6B is not converted to a repetitive pattern. This is further described below.

In addition to the string "-----", this embodiment also converts other strings of specific repetitive characters to a repetitive pattern by line unit.

Operation of the recording control unit 60 when converting a specific repetitive string to a repetitive pattern is described below.

Figure 7:
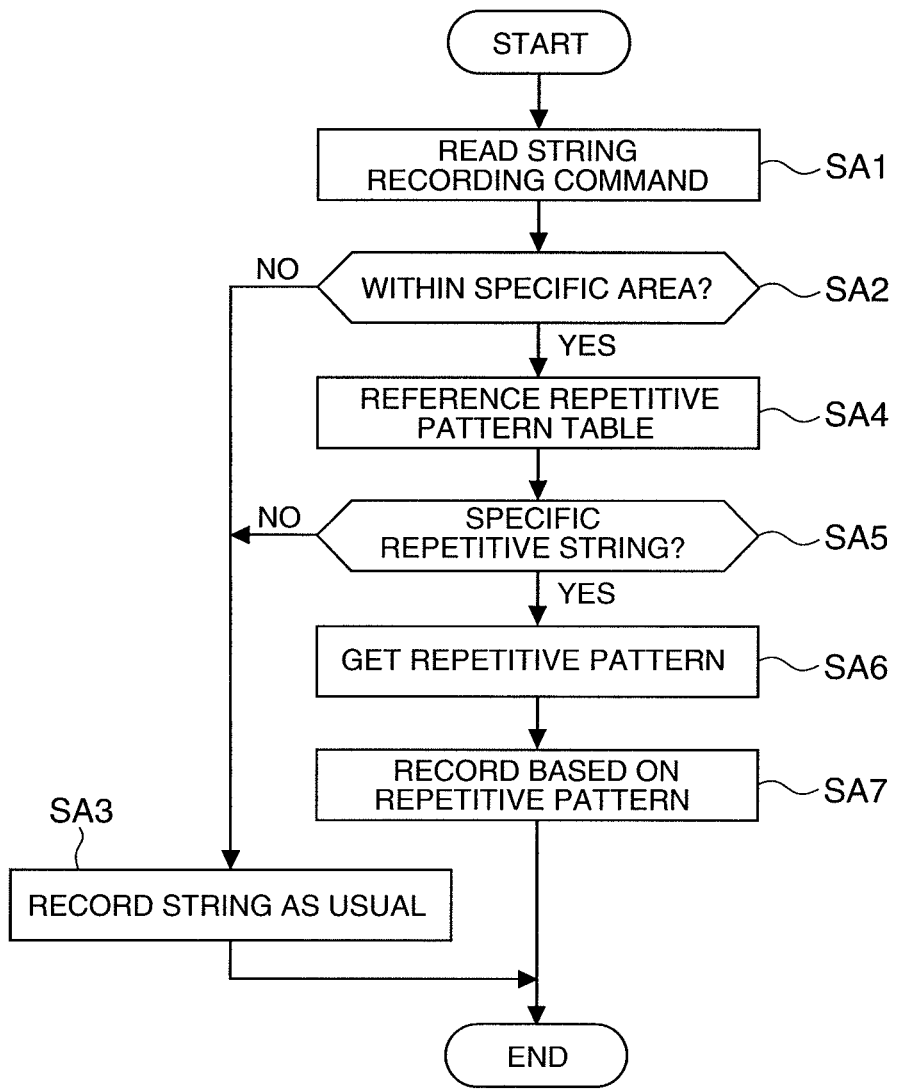
FIG. 7 is a flow chart of printer operation.

FIG. 7 is a flow chart of the operation of the recording control unit 60 when reading and executing a string recording command MK.

The function of the recording control unit 60 described below is achieved by the cooperation of hardware and software, such as a CPU reading and running firmware or a program.

First, the recording control unit 60 reads the string recording command MK from the receive buffer 56 (step SA1).

Next, the recording control unit 60 determines if the location of the string recorded by executing the string recording command MK read in step SA1 is within a specific range on the upstream side of the leading end 10a (cut end) resulting from cutting the thermal roll paper 22 and forming a receipt 10, or a specific range on the downstream side of the trailing end 10b (cut end) (step SA2).

The decision of step SA2 is a process performed for the following reason.

In this embodiment the repetitive string contained in the header image, which is the image recorded regularly at the leading end of the receipt 10, and the repetitive string contained in the footer image, which is the image recorded regularly at the trailing end, are converted to repetitive patterns. This is because thermal roll paper 22 consumption can be suppressed quite effectively by shortening the length in the conveyance direction of the header image and footer image that are regularly recorded on the receipt 10. In addition, each receipt 10 can be given a uniform appearance by uniformly converting repetitive strings contained in the header image and footer image to repetitive patterns.

Repetitive strings other than those in the header image and footer image are not converted to repetitive patterns in this embodiment. This is because strings that are not regularly recorded strings may be used to desirably record an image using the font data as is and are not intended to be converted to another image, appear infrequently compared with strings that are regularly recorded on the receipt 10 and thus contribute little to suppressing thermal roll paper 22 consumption, and therefore should not be converted to a repetitive pattern in some cases.

In addition, so that a specific area on the upstream side of the leading end 10a (cut end) when the thermal roll paper 22 is cut to form a receipt 10 is an area corresponding to the header area A1, and a specific area on the downstream side of the trailing end 10b (cut end) is an area corresponding to the footer area A5, the sizes of the specific areas are predefined based on the format of the receipt 10.

In step SA2, the recording control unit 60 determines if the string is an image contained in the header image or footer image by determining if the location of the string recorded by executing the string recording command MK read in step SA1 is in the specific area on the upstream side of the leading end 10a (cut end) formed by cutting the thermal roll paper 22 and producing a receipt 10, or the specific area on the downstream side of the trailing end 10b (cut end).

Note that the printer 2 manages the conveyance distance of the thermal roll paper 22 based on the number of steps the paper feed motor 26, which is a stepper motor, is driven; manages the position of the leading end (the previously cut end) of the thermal roll paper 22 positioned relative to the recording head 24 and the position of the trailing end (the position to be cut next) based on this conveyance distance and the output of a sensor that detects the position of the thermal roll paper 22; and based thereon can determine if the location of the string recorded by executing the string recording command MK will be in the foregoing specific areas.

If the location of the string recorded by executing the string recording command MK is not in the foregoing specific areas (step SA2 returns No), the recording control unit 60 records the string as usual based on the string recording command MK (step SA3).

However, if the location of the string recorded by executing the string recording command MK is in the foregoing specific areas (step SA2 returns Yes), the recording control unit 60 references the repetitive pattern table 72 (step SA4).

Figure 8:
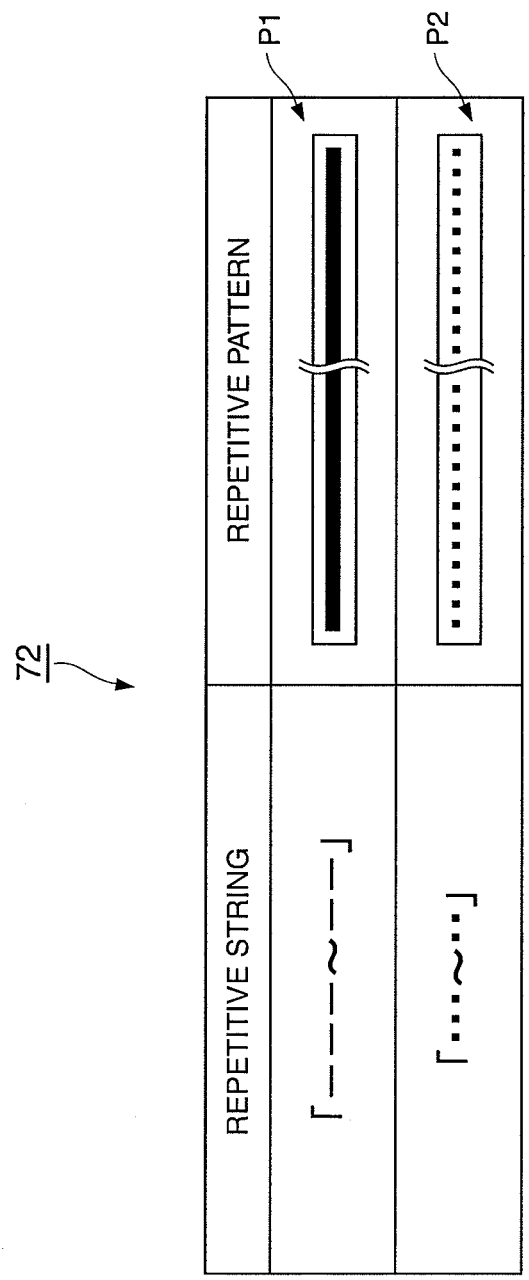
FIG. 8 shows the data structure of a repetitive pattern table.

FIG. 8 shows the structure of the repetitive pattern table 72 recorded in the storage unit 54 of the printer 2.

The repetitive pattern table 72 is a table that stores repetitive strings and related repetitive patterns.

For example, the string "-----" is stored related to repetitive pattern P1, and the string "....." is stored related to repetitive pattern P2, as shown in FIG. 8.

Each of the repetitive strings stored in the repetitive pattern table 72 is a string composed of repetitive characters of font data with white space. Each of the repetitive patterns is bitmap data that reduces areas of white space in the corresponding repetitive string. As a result, the length of the image of the repetitive string stored in the repetitive pattern table 72 is shorter (the number of dots is smaller) in the conveyance direction when recorded after being converted to the corresponding repetitive pattern than when the string is recorded based on the font data, the length of the receipt 10 in the conveyance direction can be shortened, and consumption of thermal roll paper 22 can be reduced.

A repetitive pattern is stored in the repetitive pattern table 72 for each repetitive string expected to be converted to a repetitive pattern.

The repetitive strings stored in the repetitive pattern table 72 satisfy at least the following criteria.

First, the repetitive strings stored in the repetitive pattern table 72 meet the criteria that the characters in the repetitive string have a dot count (data count or data size) in the conveyance direction of the actual data that is smaller than the dot count (data count or data size) in the conveyance direction of the white space.

Referring to FIG. 5A, for example, in the hyphen (-) character in the string "-----" the dot count (L1) in the conveyance direction of the actual data is smaller than the dot count in the conveyance direction of the white space (L2+L3).

This is for the following reason.

That is, when the dot count (data count) in the conveyance direction of the actual data in the font data is less than the dot count (data count) in the conveyance direction of the white space, the percentage of the font data that is occupied by white space is sufficiently great, and converting the string formed by the character corresponding to the font data to a repetitive pattern is particularly effective from the perspective of suppressing thermal roll paper 22 waste.

After referencing the repetitive pattern table 72, the recording control unit 60 determines if the string specified by the string recording command MK is a repetitive string stored in the repetitive pattern table 72 (step SA5). As described above, because the string in the string recording command MK is expressed by a combination of characters identified by a specific character code, whether the string specified by the string recording command MK is a repetitive string stored in the repetitive pattern table 72 can be determined easily and quickly using an existing algorithm for searching strings.

If the string specified by the string recording command MK is not a repetitive string stored in the repetitive pattern table 72 (step SA5 returns No), the recording control unit 60 goes to step SA3 and records the string as usual based on the string recording command MK.

However, if the string specified by the string recording command MK is a repetitive string stored in the repetitive pattern table 72 (step SA5 returns Yes), the recording control unit 60 references the repetitive pattern table 72 and gets the repetitive pattern corresponding to the repetitive string (step SA6).

Next, the recording control unit 60 records an image based on the acquired repetitive pattern (step SA7).

The recording control unit 60 according to this embodiment of the invention thus converts and records repetitive strings to be printed in specific areas to repetitive patterns by line unit, and thus suppresses consumption of recording medium without needing to modify the host computer 3 in order to enable suppressing recording media consumption.

More specifically, to convert and record a repetitive string as a repetitive pattern, the host computer 3 can simply specify the repetitive string and generate and send a string recording command MK for recording the repetitive string to the printer 2 as usual. The printer 2 then references the repetitive pattern table 72 and automatically converts the string to a repetitive pattern if the specific condition described above is met.

As described above, to record a string based on the string recording command MK, the recording control unit 60 according to this embodiment of the invention records the string converted to a repetitive pattern (image data) that compresses the area containing white space in each character of the string and records the repetitive pattern when the string is formed by a repetition of characters related to font data with white space having white space formed on at least one side in the direction corresponding to the conveyance direction or the direction corresponding to the opposite direction.

As a result, because a string formed by a repetition of characters related to font data with white space having white space formed on at least one end in the direction corresponding to the conveyance direction or the direction corresponding to the opposite direction is converted and recorded as a repetitive pattern formed by compressing the parts of each character in the string corresponding to the white space when recorded as an image to thermal roll paper 22, wasteful consumption of thermal roll paper 22 can be suppressed by the amount that the white space is compressed.

More particularly, because the host computer 3 can simply send a string recording command MK to the printer 2 as usual, and conversion to a repetitive pattern occurs automatically on the printer 2 side, there is no need to change the program or otherwise modify the host computer 3.

In this embodiment of the invention the repetitive pattern (image data) has at least part of the white space contained in the line removed from a line having a sequence of font data for the characters in the string.

Even if characters are recorded based on font data from which white space is removed, the printed characters are not malformed and no drawing problems result. For example, when hyphens (-) are printed repeatedly in the same line and used as a separator, recording medium waste can be suppressed while the separator is still recognizable even though white space is removed from the conveyance direction side and the opposite side.

As a result, this embodiment can suppress wasteful consumption of recording media while preventing drawing problems and an adverse effect on legibility.

The recording control unit 60 in this embodiment of the invention converts a string to a repetitive pattern when recording a string to a specific position on the thermal roll paper 22 based on the string recording command MK.

As a result, because converting only strings recorded to specific positions to repetitive patterns is possible instead of converting to repetitive patterns unconditionally, conversion to a repetitive pattern can be controlled appropriately according to the conditions.

In addition, the recording control unit 60 according to this embodiment of the invention converts repetitive strings that are to be recorded in specific areas on the upstream side in the conveyance direction and the downstream side in the conveyance direction of the position where the cutter unit 25 cuts the thermal roll paper 22 (the leading end of the receipt 10 and the position corresponding to the trailing end) to repetitive patterns.

As a result, because repetitive strings located in a specific area on the upstream side in the conveyance direction of the cut end (leading end) of the thermal roll paper 22, which is the area where an image that is expected to be regularly recorded at the leading end is recorded, or a specific area on the downstream side in the conveyance direction of the cut end of the thermal roll paper 22 (the position corresponding to the trailing end of the receipt 10 when cut), which is an area where an image that is expected to be regularly recorded at the trailing end is recorded, are converted to repetitive patterns, consumption of thermal roll paper 22 can be suppressed very effectively.

In addition, strings with a high possibility of not being a string that will be regularly recorded are not converted to repetitive patterns, and conversion to a repetitive pattern of a repetitive string that is not intended to be replaced with another image can therefore be prevented.

Embodiment 2

A second embodiment of the invention is described next.

Figure 9:
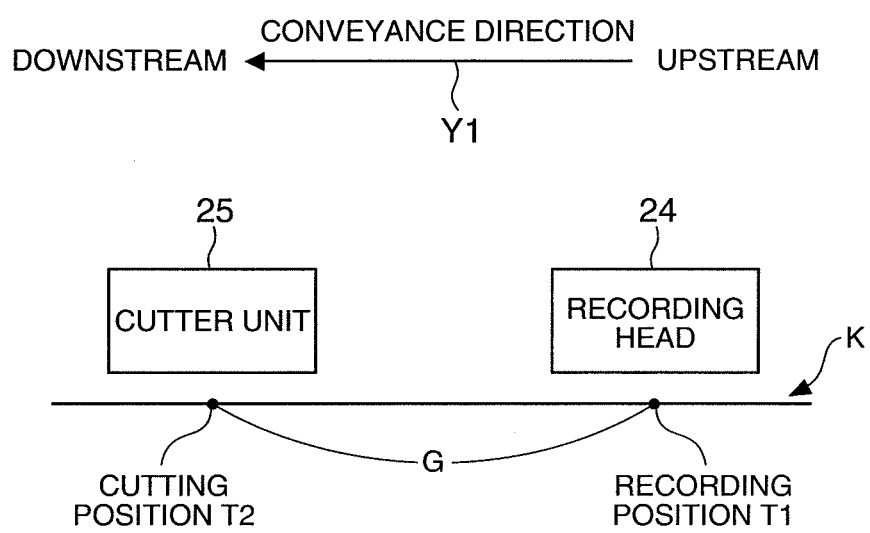
FIG. 9 schematically describes the relationship between the recording head and the cutter unit.

FIG. 9 schematically describes the relative positions of the recording head 24 and cutter unit 25.

Figure 10:
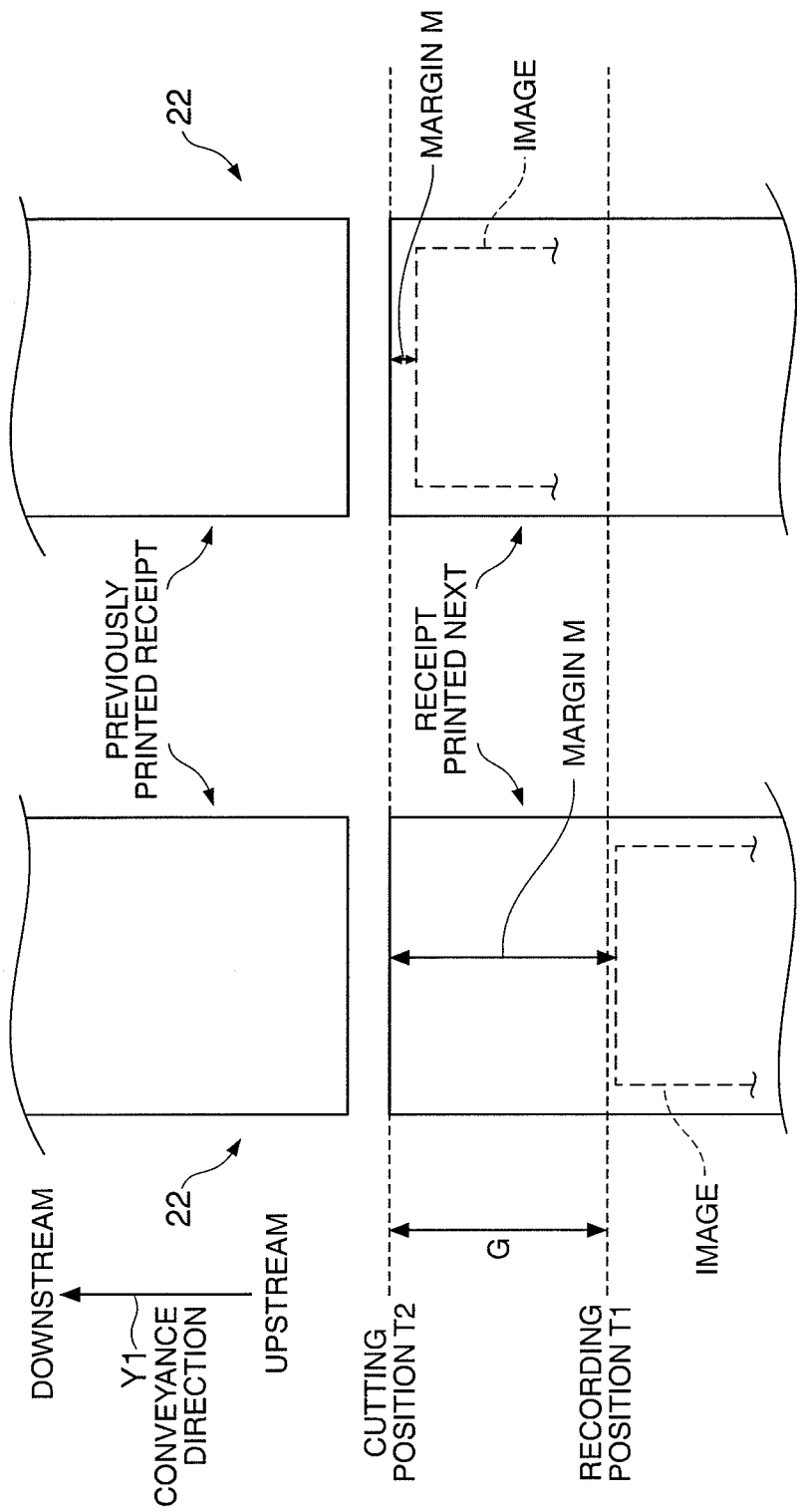
FIG. 10A and FIG. 10B describe a receipt.

FIG. 10 shows receipts 10 illustrating the difference between receipts 10 produced by a printer 2 according to the related art and receipts 10 produced by a printer 2 according to the invention.

As shown in FIG. 2 and FIG. 9, the recording head 24 is disposed to a specific position on the conveyance path K (FIG. 9) through which the thermal roll paper 22 is conveyed, and the cutter unit 25 for cutting the thermal roll paper 22 is disposed downstream in the conveyance direction Y1 from the recording head 24.

As shown in FIG. 9, there is a gap G between the recording position T1 (the position where the heat elements are located) where images are recorded by the recording head 24, and the cutting position T2 of the cutter unit 25.

The printer 2 according to the related art produces receipts 10 by a processes whereby after recording an image based on the recording data 80 for a single receipt 10 is completed, the thermal roll paper 22 is cut after the thermal roll paper 22 is conveyed until the paper cutting position of the thermal roll paper 22 reaches the cutting position T2, and then recording an image based on the recording data 80 for the next receipt 10 starts. As a result, as shown in FIG. 10A, the margin M formed between the leading end 10a of the receipt 10 and the leading end of the image recorded on the receipt 10 tends to increase due to the gap G in the conveyance direction Y1 between the recording position T1 of the recording head 24 and the cutting position T2 of the cutter unit 25.

Because this margin M is wasted space where nothing is recorded, the margin M is preferably shortened as much as possible to suppress wasteful consumption of thermal roll paper 22.

As shown in FIG. 10B, the printer 2 according to this embodiment of the invention therefore reduces the margin M by recording an image based on the recording data 80 for the next receipt 10 while conveying the thermal roll paper 22 in the conveyance direction Y1 in order to cut the thermal roll paper 22 after finishing recording an image based on the recording data 80 for one receipt 10.

This is accomplished by the following operation.

Figure 11:
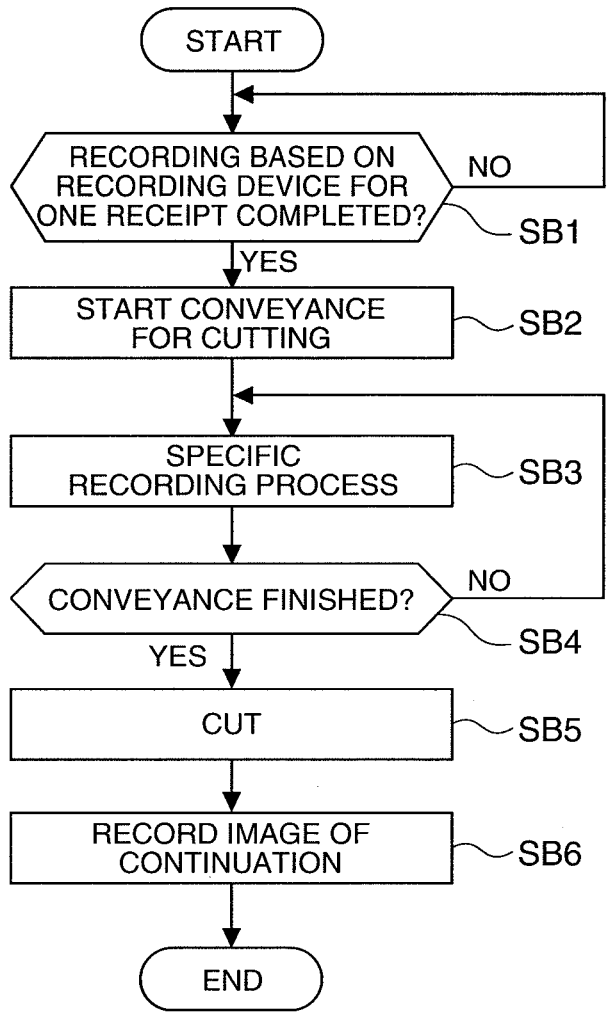
FIG. 11 is a flow chart of printer operation according to a second embodiment of the invention.

FIG. 11 is a flow chart showing the operation of the printer 2 according to the second embodiment of the invention.

Note that the operation described below assumes that the control commands (including recording data 80) for producing one receipt 10, and the control commands (including recording data 80) for producing the next receipt 10, have already been received, these control commands are stored in the receive buffer 56, and recording an image based on the recording data 80 for one receipt 10 is in progress.

The recording control unit 60 of the printer 2 monitors whether or not recording an image based on the recording data 80 for one receipt 10 has been completed (step SB1).

If recording the image is completed, the recording control unit 60 controls the print engine 51 to start conveyance to cut the thermal roll paper 22 (step SB2).

After starting conveyance for cutting, the recording control unit 60 records an image based on the recording data 80 for the next receipt 10 while conveying the paper (step SB3).

At this time the recording control unit 60 performs the following process.

That is, when executing the string recording command MK, the recording control unit 60 converts a specific repetitive string to a repetitive pattern and records the repetitive pattern. The method of converting to a repetitive pattern is the same as in the first embodiment.

While recording the image, the recording control unit 60 monitors if the cutting position of the thermal roll paper 22 has reached the cutting position T2 of the cutter unit 25 (step SB4).

If the cutting position of the thermal roll paper 22 has reached the cutting position T2 of the cutter unit 25, the recording control unit 60 interrupts image recording, controls the print engine 51, and cuts the thermal roll paper 22 (step SB5).

Next, the recording control unit 60 resumes image of continuation recording based on the recording data 80 (step SB6).

At this time the recording control unit 60 records based on the font data without converting repetitive strings to repetitive patterns.

As described above, the printer 2 according to this embodiment of the invention converts repetitive strings that are to be recorded after conveying the recording medium for cutting and before cutting to repetitive patterns, and does not convert other repetitive strings to repetitive patterns.

The reason for this is described below.

That is, as described in the first embodiment, a header image is regularly recorded to the leading end of the receipt 10. A repetitive string that is to be recorded after conveyance for cutting and before cutting is extremely likely to be a string that is recorded to the leading end of the receipt 10 and is a string that is part of the header image, and if the length in the conveyance direction of the header image that is regularly recorded to the receipt 10 can be shortened, thermal roll paper 22 consumption can be suppressed extremely effectively. In addition, the receipts 10 can be given a more consistent appearance by uniformly converting repetitive strings that are to be recorded after conveying the recording medium for cutting and before cutting to repetitive patterns.

Other repetitive strings may not be regularly recorded, may therefore not be intended for substitution by another image and may be preferably recorded as an image using the actual font data, appear less frequently than strings that are regularly recorded to receipts 10 and therefore contribute little to suppressing consumption of thermal roll paper 22, and should therefore not be converted to a repetitive pattern.

As in the first embodiment described above, modifying the host computer 3 is not required by this embodiment of the invention to suppress thermal roll paper 22 consumption. More specifically, if the host computer 3 sends a normal control command to the printer 2, the printer 2 side automatically performs the foregoing process and suppresses thermal roll paper 22 consumption.

As described above, the recording control unit 60 in this embodiment records an image with the recording head 24 on the upstream side in the conveyance direction of the cutting position of the thermal roll paper 22 while conveying the thermal roll paper 22 until the cutting position of the thermal roll paper 22 reaches the position corresponding to the cutting position T2 of the cutter unit 25 in order to cut the thermal roll paper 22 with the cutter unit 25, cuts the thermal roll paper 22 with the cutter unit 25, and converts the repetitive string recorded to the thermal roll paper 22 after conveyance for cutting and before cutting to a repetitive pattern.

The following effect can also be achieved by thus reducing the margin created between the leading end of the thermal roll paper 22 and the leading end of the image recorded to the thermal roll paper 22 by the gap G in the conveyance direction between the recording position T1 of the recording head 24 and the cutting position T2 of the cutter unit 25 when the thermal roll paper 22 is cut.

That is, a repetitive string that is extremely likely to be a string that is part of a header image is converted to a repetitive pattern, and thermal roll paper 22 consumption can be suppressed quite effectively. In addition, strings to be recorded after conveyance for cutting and before cutting are uniformly converted to repetitive patterns, and each receipt 10 can be given a more consistent appearance.

In addition, repetitive strings that are possibly not regularly recorded are not converted to repetitive patterns, and converting repetitive strings that are not intended to be replaced with another image and are preferably recorded as a direct image of the font data to repetitive patterns can be prevented.

Embodiment 3

A third embodiment of the invention is described next.

The printer 2 according to the first embodiment of the invention described above converts specific repetitive strings to corresponding repetitive patterns by line unit.

A printer 2 according to this embodiment of the invention suppresses wasteful consumption of recording media by converting characters to corresponding reduced-space font data (described below) when the characters in the string meet a specific condition, and recording the string based on the converted reduced-space font data.

Figure 12:
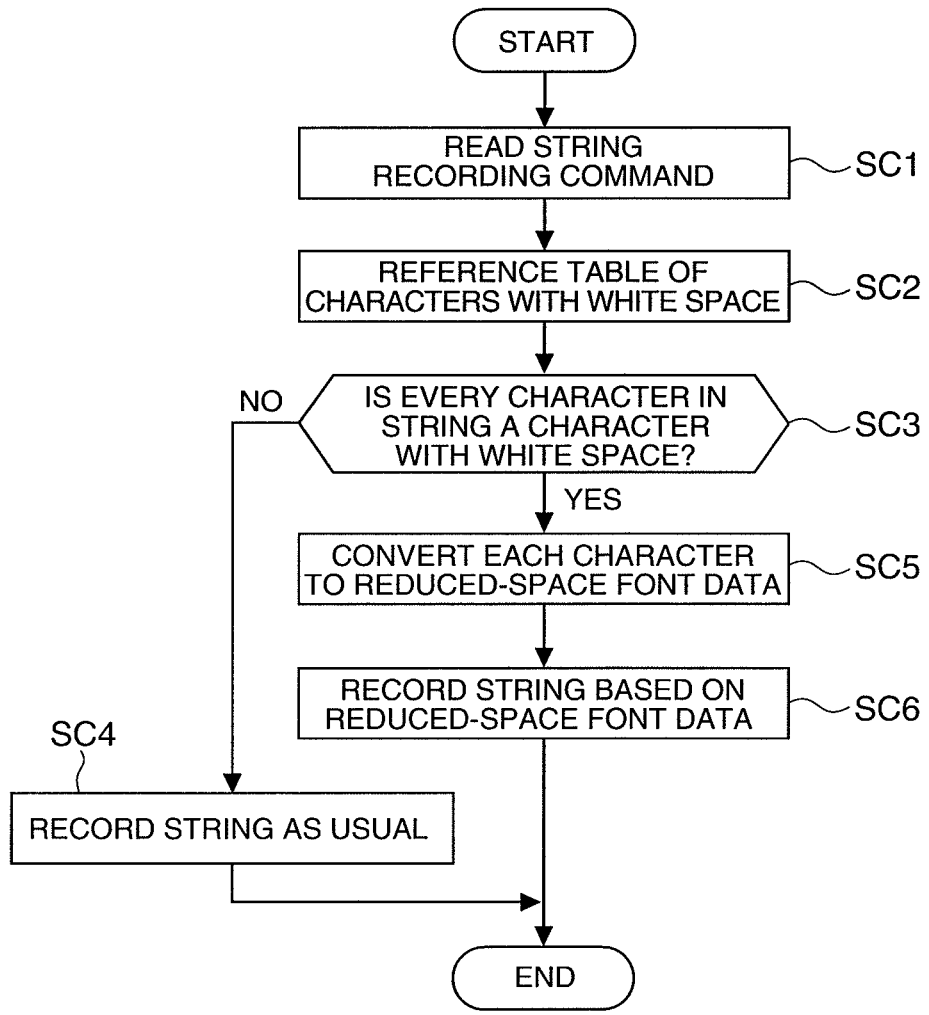
FIG. 12 is a flow chart of printer operation according to a third embodiment of the invention.

FIG. 12 is a flow chart of the operation of the printer 2 according to this embodiment of the invention.

First, the recording control unit 60 reads a string recording command MK from the receive buffer 56 (step SC1).

The recording control unit 60 then references a table of characters with white space 90 (step SC2).

Figure 13:
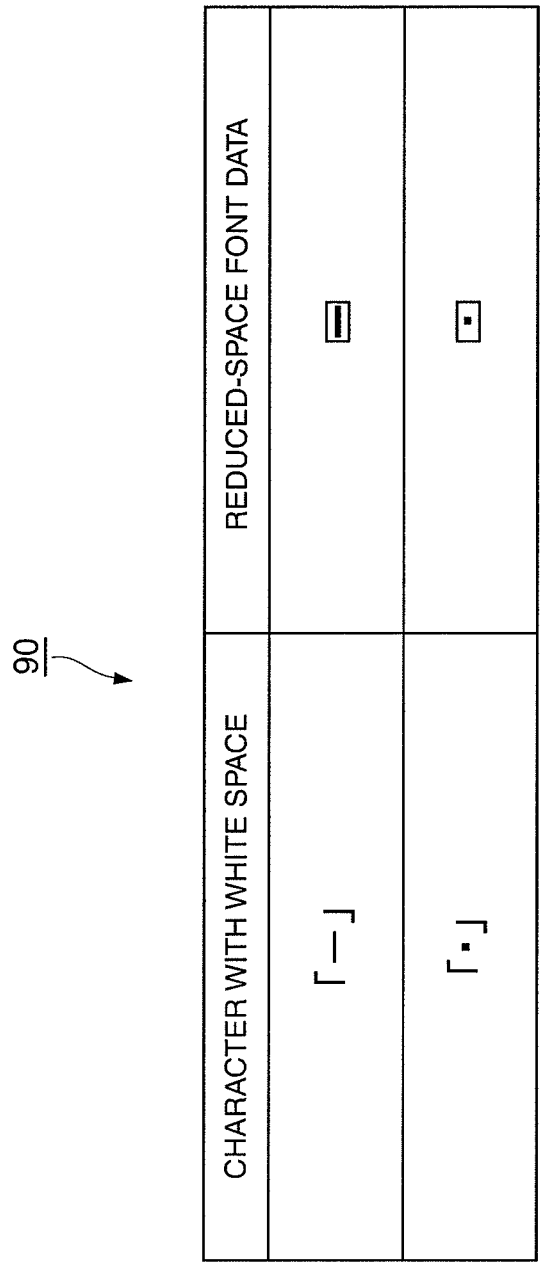
FIG. 13 shows the structure of a table of characters with white space.

FIG. 13 shows the structure of the table of characters with white space 90.

The table of characters with white space 90 is a table that stores characters with white space and corresponding reduced-space font data.

A character with white space is a character corresponding to font data with white space as described above. More specifically, a character with white space is a character, such as a hyphen (-), corresponding to font data in which white space consisting of only white pixels is formed in at least one of the direction corresponding to the conveyance direction or the direction corresponding to the opposite direction.

Reduced-space font data is data generated by removing at least part of the white space data in the font data of the corresponding character with white space. More specifically, the reduced-space font data is data of a smaller font size in the conveyance direction than the font data for the corresponding character with white space.

FIG. 14 shows an example of reduced-space font data.

Figures 14A, 14B:
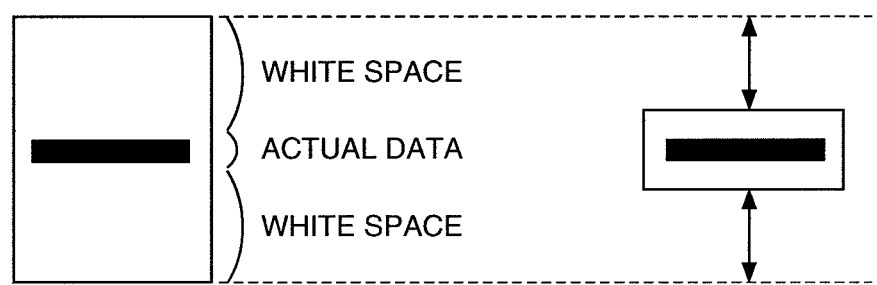
FIG. 14A and FIG. 14B describe reduced-space font data.

FIG. 14A shows font data for the hyphen (-) character, and FIG. 14B shows reduced-space font data for the same hyphen (-) character. As described above, the font data for a hyphen (-) is font data with white space consisting of only white pixels formed in both the direction corresponding to the conveyance direction and the direction corresponding to the opposite direction.

As will be obvious by comparing FIG. 14A and FIG. 14B, reduced-space font data for the hyphen (-) character is data formed by removing at least part of the white space in the font data for the hyphen (-), and is smaller in the direction corresponding to the conveyance direction than the font data for the hyphen (-) character.

A plurality of characters with white space are stored in the table of characters with white space 90. The characters with white space stored in the table of characters with white space 90 meet at least the following criteria.

Font data for characters with white space stored in the table of characters with white space 90 meet the criteria that the characters with white space have a dot count (data count) in the conveyance direction of the actual data that is smaller than the dot count (data count) in the conveyance direction of the white space. The reason for this is the same as the reason for the repetitive strings stored in the repetitive pattern table 72.

Returning to FIG. 12, after referencing the table of characters with white space 90 in step SC2, the recording control unit 60 determines if all of the characters in the string specified by the string recording command MK read in step SC1 are a character with white space stored in the table of characters with white space 90 (step SC3).

For example, if the string specified by the string recording command MK is a string of hyphens (-) and periods (.), and both the hyphen (-) and period (.) characters are registered in the table of characters with white space 90, the recording control unit 60 determines in step SC3 that "all characters in the string specified by the string recording command MK read in step SC1 are characters with white space stored in the table of characters with white space 90" (step SC3 returns Yes).

If even only one character in the string specified by the string recording command MK is a character that is not registered in the table of characters with white space 90 (step SC3 returns No), the recording control unit 60 records the string as usual based on the string recording command MK (step SC4).

However, if all characters in the string specified by the string recording command MK read in step SC1 are characters with white space stored in the table of characters with white space 90 (step SC3 returns Yes), the recording control unit 60 converts each character to the corresponding reduced-space font data based on the table of characters with white space 90 (step SC5), writes the reduced-space font data to the print buffer, and records an image of the string (step SC6).

Note that if different reduced-space font data is used for the characters in the string to be recorded, and the dot count in the direction corresponding to the conveyance direction is not the same in all of the reduced-space font data, the reduced-space font data is written to the print buffer after making any necessary adjustment.

When the characters of a string on the same line are characters corresponding to specific font data with white space, the recording control unit 60 according to this embodiment of the invention converts each character to reduced-space font data and then records an image of the string. As a result, the dot count in the conveyance direction of the recorded string is reduced, and wasteful consumption of thermal roll paper 22 can be suppressed.

As described above, when the characters of a string on the same line are composed of one or more characters corresponding to font data with white space, the recording control unit 60 according to this embodiment of the invention converts each character to font data with a font size that is smaller in the conveyance direction by removing at least part of the white space, and then records the string by the recording head 24.

As a result, the size in the conveyance direction of the string recorded to the thermal roll paper 22 becomes smaller, and wasteful consumption of thermal roll paper 22 can be suppressed.

More particularly, because the host computer 3 can simply send a string recording command MK to the printer 2 as usual, and conversion occurs automatically on the printer 2 side, there is no need to change the program or otherwise modify the host computer 3.

Embodiment 4

A fourth embodiment of the invention is described next.

The foregoing embodiments convert specific characters or specific strings to previously stored repetitive patterns or reduced-space font data.

A printer 2 according to this embodiment of the invention does not previously store the post-conversion data, and instead converts characters meeting a specific condition by applying a specific process.

Figure 15:
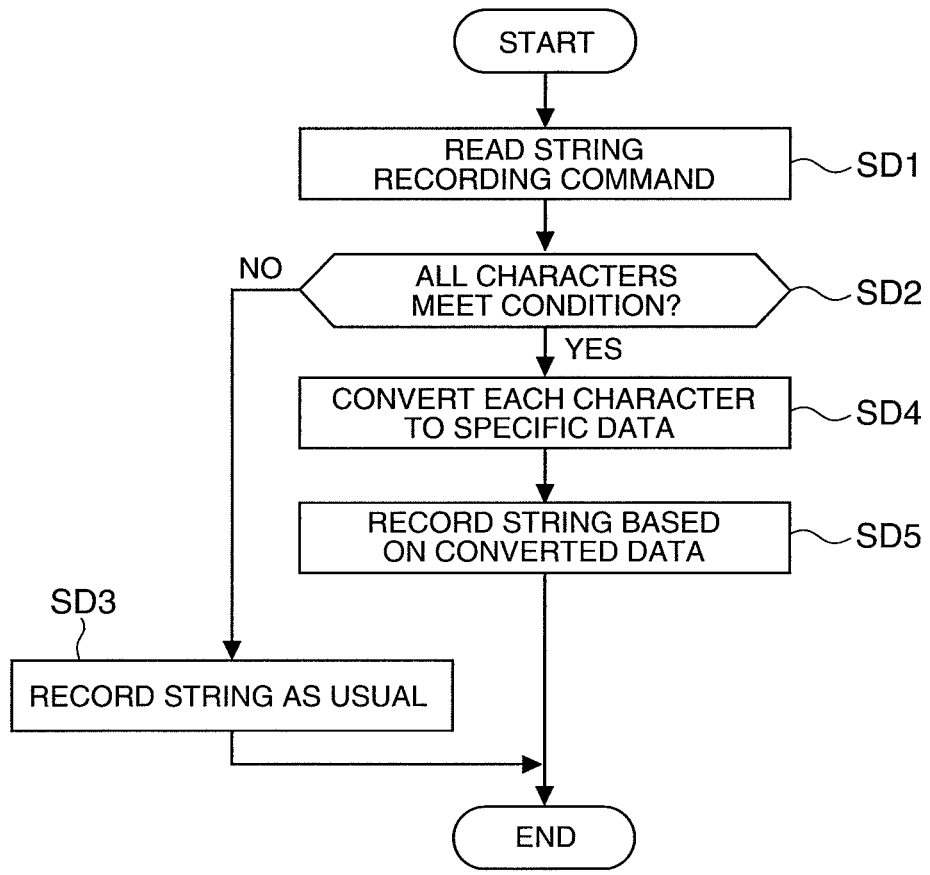
FIG. 15 is a flow chart of printer operation according to a fourth embodiment of the invention.

FIG. 15 is a flow chart of the operation of a printer 2 according to this embodiment of the invention.

First, the recording control unit 60 of the printer 2 reads a string recording command MK (step SD1).

Next, the recording control unit 60 determines if all of the characters in the string specified by the string recording command MK read in step SD1 meet the following condition (step SD2).

More specifically, the recording control unit 60 determines if all of the characters meet the condition that the dot count (data count) in the conveyance direction of the actual data in the corresponding font data is less than the dot count (data count) in the conveyance direction of the white space. Referring to FIG. 5A, for example, the recording control unit 60 determines if the dot count (L1) of the actual data in the font data for the hyphen (-) character is smaller than the dot count of the white space (L2+L3).

If there is even one character in the characters of the string specified by the string recording command MK that does not meet the above condition (step SD2 returns No), the recording control unit 60 records the string as usual based on the string recording command MK (step SD3).

However, if all of the characters of the string specified by the string recording command MK meet the above condition, the recording control unit 60 converts the font data for each character to data from which at least part of the white space is omitted (step SD4).

This conversion is done as follows, for example.

The recording control unit 60 first gets the dot count of the white space formed on the side in the direction corresponding to the conveyance direction, and the dot count of the white space formed on the side in the direction corresponding to the opposite direction, for the font data of all characters. If the dot count of the white space formed on the conveyance direction side is 8 dots or more in the font data for all characters, the recording control unit 60 uniformly deletes a white space of 5 dots, which is 8 dots minus a specific dot margin, from the font data of each character. White space of a specific number of dots is likewise deleted from the white space formed on the opposite direction side. The recording control unit 60 generates post-conversion data for each character as described above, for example.

The conversion method is obviously not limited to the foregoing method. More specifically, any method that converts to data with a smaller dot count in the conveyance direction than the dot count in the conveyance direction of the font data before conversion by deleting part of the white space can be used.

Next, the recording control unit 60 writes the converted data to the print buffer and records an image of the string (step SD5).

More specifically, if all of the characters in a string on the same line meet the condition that the dot count (data count) in the conveyance direction of the actual data in the corresponding font data is less than the dot count (data count) in the conveyance direction of the white space, the recording control unit 60 in this embodiment of the invention converts each of the characters to data that omits at least part of the white space and then records an image of the string. As a result, the dot count in the conveyance direction of the recorded string is reduced, and wasteful consumption of thermal roll paper 22 can be suppressed.

This embodiment converts the characters to specific data when the characters in a string meet a specific condition, but could be configured as described below.

More specifically, a configuration that compares the dot count in the conveyance direction of the actual data and the dot count in the conveyance direction of the white space in the font data of the string (a data array of font data for each character in the string) for all of a string recorded on the same line; and when the dot count of the actual data is small, generates image data (converts to image data) removing at least part of the white space in the font data of the string (a data array of font data for each character in the string), and records an image of the string based on the image data, is also conceivable.

Like the foregoing embodiments, this configuration can also suppress wasteful consumption of thermal roll paper 22.

As described above, when recording a string, the recording control unit 60 according to this embodiment compares the size in the conveyance direction of the actual data in the font data of each character in the string with the size in the conveyance direction of the white space, and when the actual data is smaller, applies the specific conversion described above.

When the size in the conveyance direction of the white space is smaller than the size in the conveyance direction of the actual data in the font data of a particular character, the percentage of the font data occupied by white space is sufficiently large, and applying the foregoing conversion to the string formed by the characters corresponding to the font data is particularly effective in terms of suppressing recording medium waste.

As a result, this configuration can more effectively suppress thermal roll paper 22 waste.

The foregoing embodiments describe preferred embodiments of the invention, and can be modified and applied as desired without departing from the scope of the invention.

For example, the printer 2 can be configured so that the area of the recording medium (thermal roll paper 22) in which strings are converted can be selected by a command received from the host computer 3 or operation of a switch.

This configuration improves convenience because the range in which the foregoing conversion is applied to the recording medium can be freely defined.

The functional parts shown in FIG. 3 can also be desirably achieved by cooperation between hardware and software components, and do not suggest any particular hardware configuration.

The foregoing embodiments describe the printer 2 having a control unit 50 with the recording control unit 60, but the function of the control unit 50 could be rendered in a separate device externally connected to the printer 2, for example.

The invention is also not limited to a thermal printer, and can be applied to any type of printer, including an inkjet printer, a dot impact printer, a laser printer, or a dye sublimation printer. The printer could also be incorporated in an ATM or other device. The invention can also be used to record on media other than paper, including the label side of CD media or the label side of DVD media.

A program enabling applying the invention may also be included in a printer driver installed to the host computer 3.

Further alternatively, a program that executes the steps shown in the flow charts described above and is stored on an external storage medium of the printer 2 could be read and run by the control unit 50.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A recording device capable of connecting to a control device, comprising:
   a recording head configured to record on a recording medium;
   a conveyance unit configured to convey the recording medium in a conveyance direction;
   a reception unit configured to receive characters from the control device;
   a storage unit configured to store font data corresponding to the characters; and
   a recording control unit configured to read font data corresponding to the characters from the storage unit and records on the recording medium based on the characters received by the reception unit, and
   when font data for one or more than one of a hyphen or a dot on the same line is received by the reception unit the recording unit converts the font data on the same line to font data with less white space, and records by the recording head;
   wherein by reducing the white space, number of dots in a direction corresponding to the conveyance direction of the recording medium is reduced, such that reduction in length of the recording medium results; and
   the recording control unit compares the dot count in the conveyance direction of the actual data that is actually recorded by driving the recording head and the dot count in the conveyance direction of the white space contained in the font data for the hyphens or the dots before conversion, and applies the conversion when the dot count of the actual data is smaller than the dot count of the white space.

2. The recording device described in claim 1, wherein:
   the recording control unit applies the conversion when the characters received by the reception unit are to be recorded to a specific position on the recording medium.

3. The recording device described in claim 2, further comprising:
   a cutting unit configured to cut the recording medium;
   wherein the recording control unit applies the conversion when the hyphens or the dots are to be recorded in a specific area on the upstream side in the conveyance direction or the downstream side in the conveyance direction from the cut position where the cutting unit cuts the recording medium.

4. The recording device described in claim 2, further comprising:
   a cutting unit that is disposed downstream side in the conveyance direction from the recording head and cuts the recording medium;
   wherein the recording control unit applies the conversion when the hyphens or the dots are to be recorded in a specific area on the upstream side in the conveyance direction from the cut position of the recording medium.

5. The recording device described in claim 2, wherein:
   the recording control unit sets the specific position on the recording medium based on a command received from a control device or input from an input unit.

6. A method of controlling a recording device that is capable of connecting to a control device and has a recording head configured to record on a recording medium, a conveyance unit configured to convey the recording medium in a conveyance direction, a reception unit configured to receive characters from the control device, a storage unit configured to store font data corresponding to the characters, and a recording control unit configured to read font data corresponding to the characters from the storage unit and records on the recording medium based on the characters received by the reception unit, the control method comprising:
   receiving one or more than one character from the control device by the reception unit; and
   when font data for one or more than one of a hyphen or a dot on the same line is received by the reception unit, converting the font data on the same line to font data with less white space, and recording by the recording head;
   wherein by reducing the white space, number of dots in a direction corresponding to the conveyance direction of the recording medium is reduced, such that reduction in length of the recording medium results, and
   the recording control unit compares the dot count in the conveyance direction of the actual data that is actually recorded by driving the recording head and the dot count in the conveyance direction of the white space contained in the font data for the hyphens or the dots before conversion, and applies the conversion when the dot count of the actual data is smaller than the dot count of the white space.

7. The control method for a recording device described in claim 6, wherein:
   the font data after conversion omits at least part of the white space from the font data for the hyphens or the dots before conversion; and
   the image data after conversion omits at least part of the white space from the font data for the hyphens or the dots before conversion.

8. The control method for a recording device described in claim 6, wherein:
- the recording control unit applies the conversion when the hyphens or the dots received by the reception unit are to be recorded to a specific position on the recording medium.

9. The control method for a recording device described in claim 8, wherein:
- the recording device has a cutting unit configured to cut the recording medium; and
- the recording control unit applies the conversion when the hyphens or the dots are to be recorded in a specific area on the upstream side in the conveyance direction or the downstream side in the conveyance direction from the cut position where the cutting unit cuts the recording medium.

10. The control method for a recording device described in claim 8, wherein:
- the recording device has a cutting unit that is disposed downstream side in the conveyance direction from the recording head and cuts the recording medium; and
- the recording control unit applies the conversion when the hyphens or the dots are to be recorded in a specific area on the upstream side in the conveyance direction from the cut position of the recording medium.

11. The control method for a recording device described in claim 8, wherein:
- the recording control unit sets the specific position on the recording medium based on a command received from a control device or input from an input unit.

* * * * *